United States Patent [19]

Bardebes

[11] 4,104,820

[45] Aug. 8, 1978

[54] FISH HOOKS

[76] Inventor: David Paul Bardebes, 12 Yatton St., Greerton, Tauranga, New Zealand

[21] Appl. No.: 683,566

[22] Filed: May 5, 1976

[30] Foreign Application Priority Data

Jan. 28, 1976 [NZ] New Zealand .......................... 179852

[51] Int. Cl.$^2$ ............................................. A01K 83/02
[52] U.S. Cl. ............................................ 43/36; 43/37
[58] Field of Search ................ 43/34, 35, 36, 37, 43.1, 43/43.4, 44.83, 44.86, 42.74, 44.92

[56] References Cited

U.S. PATENT DOCUMENTS

| 2,162,739 | 6/1939 | Mindek, Jr. | 43/42.74 |
| 2,730,831 | 1/1956 | Williams | 43/36 |
| 3,986,289 | 10/1976 | Zimmerman et al. | 43/36 |

FOREIGN PATENT DOCUMENTS 2,145,634  3/1973  Fed. Rep. of Germany .............. 43/36

Primary Examiner—Russell R. Kinsey
Assistant Examiner—Robert P. Swiatek
Attorney, Agent, or Firm—Ladas, Parry, Von Gehr, Goldsmith & Deschamps

[57] ABSTRACT

A fish hook comprises at least two arms, each having at one end or being adapted to receive at one end laterally extending spikes adapted to receive bait. The arms are adapted to be biased towards each other to a position in which the spiked ends are in close disposition to each other. On a desired force being applied to the biased spiked ends of the arms, the spiked ends of the arms move apart.

5 Claims, 18 Drawing Figures

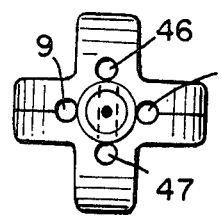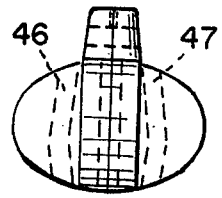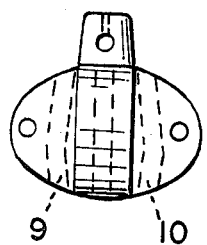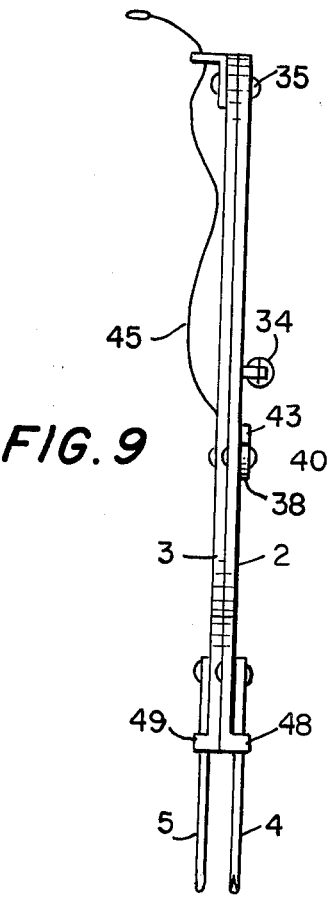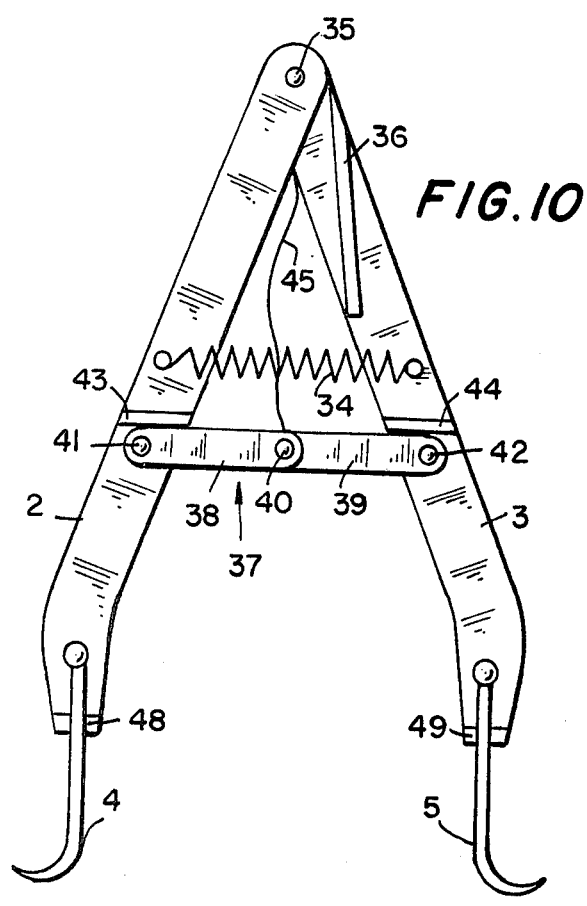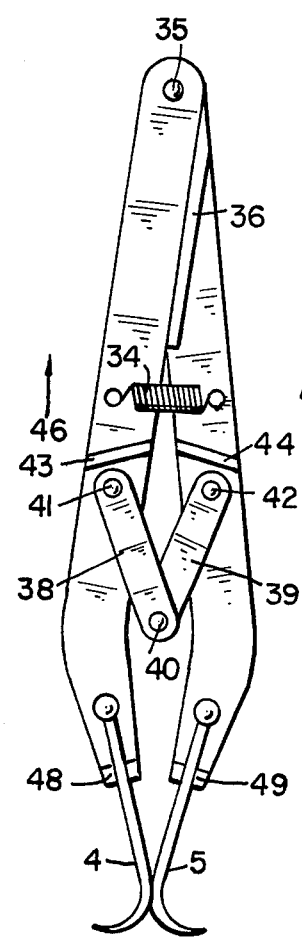

FISH HOOKS

This invention relates to fish hooks.

Many proposals exist for fish hooks but a notable deficiency in all fish hooks has been their inability to secure fish substantially every time a fish bites at the bait on the hook.

It is an object of this invention to provide a fish hook whereby the tug of a fish pulling on the bait causes the hook to spring apart to secure the fish.

According to this invention there is provided a fish hook comprising at least two arms each containing at one end laterally extending spikes adapted to receive bait such that said arms are adapted to be biassed towards each other in a position where the spiked ends are in close disposition to each other, the arrangement being such that on a desired force being applied to the biassed spiked ends of the arms, the spiked ends of the arms move apart.

According to a preferred form of the invention there is provided a fish hook comprising at least two arms adapted to be biassed towards each other, each containing at one end, laterally extending spikes adapted to receive bait, an actuating means adapted to cooperate with the arms, such that in the actuating position of said actuating means the arms are located in a biassed position where the two spikes are closely aligned, the arrangement being such that on a desired force being applied to the biassed spiked ends of the arms, the actuating means actuates and the spiked ends of the arms move apart.

A preferred form of the invention will now be described by reference to the accompanying drawings in which:

FIG. 6 is a plan view of an alternative actuating means of this invention;

FIG. 7 is a side elevation of the actuating means of FIG. 6;

FIG. 8 is a side elevation of the actuating means of FIG. 6 from a direction perpendicular to that of FIG. 7; and FIGS. 9, 10 and 11 show respectively a side view and plan view of an alternative fish hook of this invention in an actuated position and a plan view of the fish hook in an actuating position.

Figure 1:
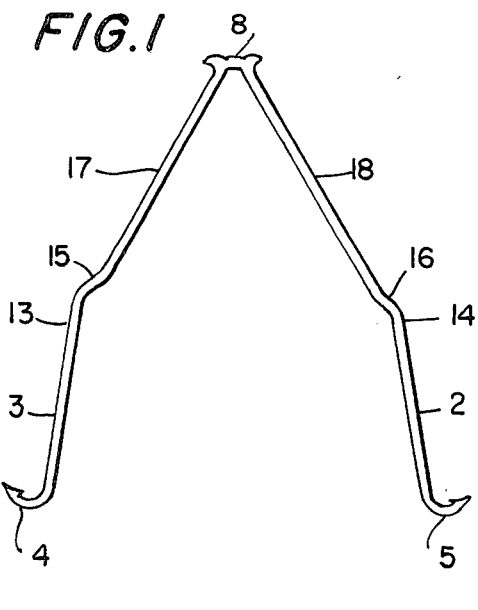
FIG. 1 is a plan view of preferred arms of this invention.
Figure 2:
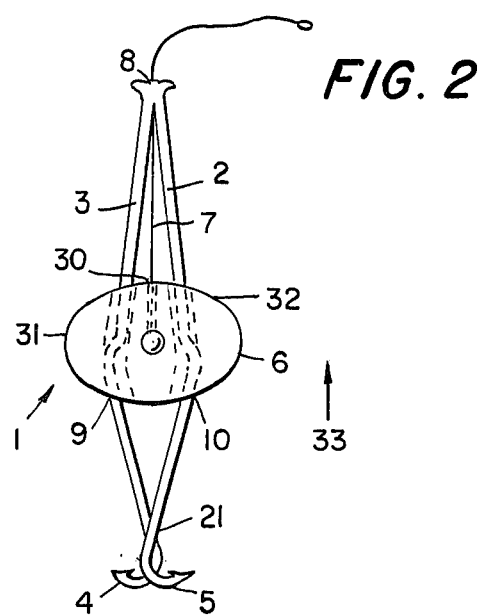
FIG. 2 is a plan view of the fish hook of this invention showing the actuating means in its actuating position.

The fish hook indicated by arrow 1 (FIG. 2) has at least two arms 2 and 3 having at one end of each, spikes 4 and 5 with the arms in FIG. 1 being shown in their natural position, while in FIG. 2 they are in a biassed position where the spikes 4 and 5 are closely aligned, with the actuating means 6 being shown in its actuating position. The two arms 2 and 3 are joined at their other ends at position 8 about which the arms can either pivot with a suitable pivot mounting or else can bend. The fishing line 7 is secured to the fish hook in such a manner that it can exert a force on the actuating means in its actuating position to actuate the said actuating means in order that the arms 2 and 3 can move apart.

Bait (not shown) is secured preferably separately to each of the spikes 4 and 5 so that the bait itself does not tend to exert a biassing force on the ends of the arms to hold the spikes together. In the closed portion shown in FIG. 2, the bait (not shown) on each of the spikes 4 and 5 will tend to merge almost into one piece of bait insofar as its appearance to a fish is concerned.

The actuating means 6 in its actuating position can be actuated by a tug by a desired size of fish on biting the bait upon which the arms move apart so that the spikes will then be urged into the inside of opposite surfaces of the fish's mouth.

The two arms 2 and 3 of the fish hook of the invention can be biassed towards each other by a resilient biassing means or against a resilient biassing means. In the former case referring to FIGS. 9 to 11, an expansion spring 34 can be pivotable about pivot point 35, and said spring urging the two arms together to the position shown in FIG. 11, with a buffer 36 defining the final position of arm 2 in relation to arm 3. The actuating means indicated by arrow 37 consists of two levers 38 and 39 pivotally mounted together at 40 and to each of the arms 2 and 3 at 41 and 42 respectively. Fishing line 45 is attached to the pivot point 40 and on a directional force in direction of arrow 46 in FIG. 11, the levers move in such direction to the position shown in FIG. 10. Buffers 43 and 44 prevent overtravel of levers 38 and 39 respectively.

Spring 34 will be relatively weak in order that the force exerted by a fish biting bait secured to spikes 4 and 5 is sufficient to cause the levers 38 and 39 to move to force arms 2 and 3 apart. The length of each lever is also chosen to give a mechanical advantage in the actuating means to assist in said levers spreading the arms apart. The strength of the spring and the length of the levers can be chosen to suit a desired size of fish to be caught.

The latter case is however, preferred because of simplicity of construction and also because of the increased rapidity of the opening action hence lessening the chance of a fish failing to be secured on the spikes 4 and 5. In this form of the invention a cam means is provided following the external profile of each of arms 2 and 3 such that in the biassed position of said arms, the cam means locks on said external profile but is displaceable by a desired force. The resilient biassing means against which the cam means operates can be independent resilient means or else can be the inherent resilience of a length of resilient material.

Figure 5:
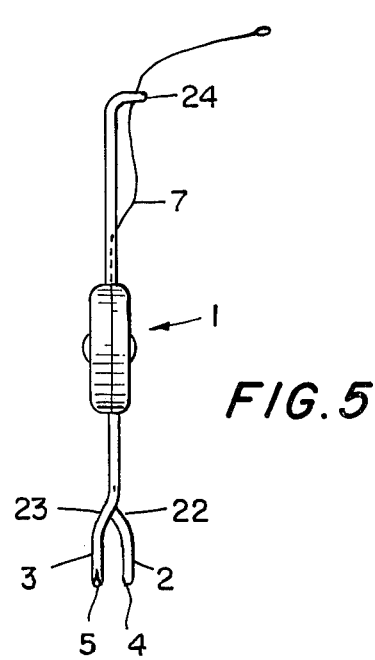
FIG. 5 is a side view of the arms of the invention biassed in an activated position.

Referring to FIGS. 1, 2 and 5, cam means 6 follows the external profile of arms 2 and 3 such that as it is urged downwards in the reverse direction to arrow 33 in FIG. 2 it urges arms 2 and 3 towards each other until the biassed position shown in FIG. 2 is reached, in which position the cam means 6 locks on the profile of arms 2 and 3 to give a static position. The cam means is adapted to hold this position against a resilient biassing means e.g. a compression spring (not shown) located and compressed between positions 17 and 18 of arms 2 and 3, or alternatively an expansion spring or springs (not shown) located in an expanded position between bending point 8 of arms 2 and 3 and position 30 and/or 31 and 32 on said cam means. As will be discussed hereinafter it is preferred that there be free travel of the cam means 6 up towards bending point 8 of the arms 2 and 3 so that of these two systems, the system employing expansion springs is preferred.

Preferably for simplicity, the resilient biassing means can be provided by providing the arms of a suitably resilient material itself, e.g. spring metal or a resilient plastics material, desirably spring steel and more desirably, a noncorrosive material, - stainless steel. The arms in this instance will then be made of an integral length of the resilient material, bent at one point 8 with the cam closing the two arms together against the natural resilience of the material and when the cam is displaced from its actuating position by the tug of a fish on biting the bait on the spikes 4 and 5, the arms spring naturally apart.

The preferred cam means of this invention is adapted in its actuating position to hold the two arms together in their biassed position and to be movable from said actuating position by the tug of a fish on biting the bait. In order to be suitable for catching a desired size of fish dependent on the spike size the force necessary to move said cam from its actuating position can be predetermined. Hence when the hook is adapted to catch a large fish, the cam in its actuating position will require a relatively larger force to displace it, than when the hook is designed to catch a smaller fish.

Figure 3:
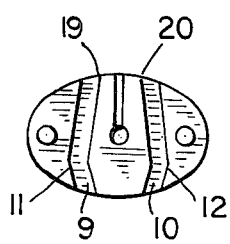
FIG. 3 is a half section of a preferred actuating means of this invention.
Figure 4:
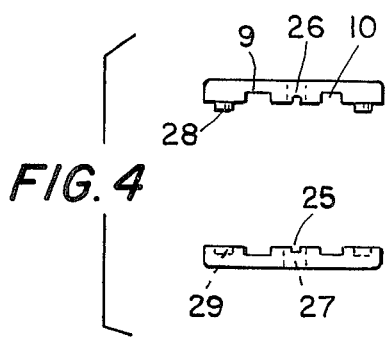
FIG. 4 shows a side explosive view of a preferred form of the actuating means of FIG. 3 of this invention.

The preferred cam means of the invention is shown by reference to FIGS. 3 and 4 where the cam is provided with two guide holes 9 and 10, through which each arm 2 and 3 is received, each of said guide holes 9 and 10 having a shoulder 11 and 12. Each of the arms 2 and 3 (referring to FIG. 1) having an outwardly directed protrusion 13 and 14 formed adapted to follow the internal surface of the guide holes 9 and 10 (FIG. 3) and of a profile such that the shoulders 11 and 12 can lock on the said protrusions 13 and 14 (in FIG. 1) to achieve the static position of FIG. 2 but also such that a desired minimum force on the spikes 4 and 5 in FIG. 2 can displace the cam off the said protrusions to allow the arms 2 and 3 in FIG. 1 to spring apart, preferably rapidly, as discussed above. In order to secure this advantage, the profile in the guide holes 9 and 10 (FIG. 3) and also on the protrusions 13 and 14 (FIG. 1) is chosen in such a manner that a predetermined force will move the cam off the shoulders.

The shoulders 11 and 12 in the guide holes 9 and 10 will thus be more or less inclined towards the vertical axis of the cam as shown in FIG. 3 depending on whether the hook is to catch a large fish or a small fish.

The protrusion portions 13 and 14 in the arms have a profile on their leading edge 15 and 16 inclined inwardly towards the longitudinal axis of the arms (FIG. 1), so that there is a rapid movement of the cam once displaced from its actuating position shown (FIG. 2). Increasing this angle of inclination gives more rapid movement of the cam from its actuating position. In order that there is no jerking motion created by too large an angle which could cause back lash to the spikes and possibly disengagement of the fish from the spikes, the profile of the leading edges 15 and 16 is preferably a gentle smooth curve.

A further preferred feature of the invention is providing the first portions of each arm 2 and 3 close to bending point 8 (FIG. 1) as substantially straight lengths of material so that the upper portion of the arms about the point 8 in FIG. 1 is in a substantial V shape. The arms engage the inside surface of the guides 9 and 10 at the leading edges 19 and 20 in FIG. 3 so that the fishing line 7 in FIG. 2, secured to the cam 6, at e.g. the center of cam, urges the cam back into the V portion, when a tug or pull is exerted by a fish on spikes 4 and 5, with the portions 19 and 20, then urging the arms 2 and 3 further apart. Hence the more pressure exerted by the fish when secured on the spikes 4 and 5, causes the spikes 4 and 5 to engage tighter in the fish's mouth. The points 19 and 20 are preferably curved at the opening of the said guide holes 9 and 10 in order to give free movement over the material of the arms at positions 17 and 18 (FIG. 1).

Since the arms 2 and 3 in FIG. 1 need to cross each other when the arms are in their biassed position shown in FIG. 2, and in order to reduce the tendency of the two arms 2 and 3 in their cross-over position to drag on each other, which would reduce the rapidity of the motion of arms 2 and 3 when springing apart, the trailing edge of the protrusions 13 and 14 of arms 2 and 3 (FIG. 1) can turn back more slowly than the leading edges in order that the cross-over point 21 shown in FIG. 2, is removed away from the cam in its actuating position. Alternatively, as shown in FIG. 5, each arm can be bent away from the plane of the two arms at the points 22 and 23 so that the two arms at the cross-over point do not need to touch each other.

A small gap as shown in FIG. 5 exists between the two spikes 4 and 5 in order to accommodate the thickness of bait and reduce the drag of the bait on each spike on each other and allow free motion of the spikes over each other when the cam is displaced from its actuating position. With the arrangement shown in FIG. 5, the two arms can be bent away from each other at the points 22 and 23 to a distance slightly greater than half the thickness of the arms, to give the gap between the spikes 4 and 5. A hole or other guide means 24 is provided at the point 8 of the arms for the purpose of guiding the fishing line 7 and such hole can simply be formed by bending the materials about each other at the point 8, to give such hole.

The preferred cam means 6 of this invention can be formed as shown in FIG. 4 by moulding in two halves with suitable recesses formed in each half to form the guide holes 9 and 10. Preferably each half portion can have further recess portions 25 and 26 in order to accommodate the fishing line or trace and the two half portions can be secured together by any suitable securing means, e.g. by providing a bore shown dotted at 27, to accommodate a securing means, e.g. a bolt and nut arrangement or else a pop-rivet and the invention is adapted such that the fishing line or trace can be secured in the cam about said securing means in said hole 27 (FIG. 4) at the same time as the two half portions are secured together. A permanent trace can be attached to the cam, preferably of relatively great strength, e.g. a steel trace 7 (FIG. 2), passing through guide hole 24 (FIG. 5); and to the end of the steel trace 7 (FIG. 2), a swivel (not shown) can be attached. In addition, each half of the cam means can be provided with male securing members 28 to be received in female recesses 29 in the other half, in order to lock the two halves of the cam against relative movement.

In order that there is at least an initial securing action of the fish hook on a fish after taking the bait, the spiked portions 4 and 5 extend slightly beyond each other when in the actuating position shown in FIG. 2.

Furthermore, the spiked portions 4 and 5 can be provided with barbs to lock in the fish's mouth and/or to hold the bait but it is possible in accordance with the invention, to avoid the use of barbs which tend to be hazardous in use.

Further arms, in pairs, can be provided with the cam means having an equivalent number of guide holes. For example, a further pair of arms perpendicular to the plane of the first pair of arms can be provided, with actuating means being as shown in FIGS. 6 – 8 with the two further guide holes 46 and 47 in the cam being also aligned perpendicular to the plane of the first pair of guide holes 9 and 10. The two spikes on the extra pair of arms extend close and perpendicular to the first pair of spikes, to form when all spikes are loaded with bait, one apparent target for the fish. On being triggered by the one cam mechanism the two pairs of spikes open at right angles to each other so that four spikes are available to secure the fish. Smaller dimensional spikes for a desired fish can then be used and are especially suitable for soft mouthed fish.

In addition, the whole hook can be camouflaged, e.g. in the shape of a fish, in such a manner so as not to impair the operation of the hook.

A further embodiment of the invention is to provide an apparatus into which conventional fish hooks can be secured in a replaceable manner. For example, referring to FIGS. 9, 10 and 11, the shafts of each hook 4 and 5 are engageable in self closing slots 48 and 49 located towards the end of each arm 2 and 3 with the eyelet of each hook being secured by a main pin passing therethrough and through each arm with e.g. a split pin, securing the other end of the main pin to each arm.

So that different sized hooks can be employed and the same relative disposition of the spiked ends of the hooks 4 and 5 achieved in the actuating position shown in FIG. 11, the position of buffer 36 is adjustable to give the requisite degree of travel to arm 2 in relation to arm 3.

An alternative and preferred arrangement is shown in reference to FIGS. 12, 13, 14 and 15 of the drawings where the two arms of the invention 2 and 3 of the same shape and of the same material as shown in FIG. 1, having at each end a hook receiving portion indicated by arrows 50 and 51, said hook receiving portion being formed by turning back the end portions 52 and 53 of each arm to define a channel indicated as 54 and 55. The turned back portions 52 and 53 have shoulders at 56 and 57 approximately centrally along the said turned back portion 52 and 53 although the exact position of the shoulder is not critical as will be discussed further below.

The eyelet of a normal shaped hook 58 and 59 can pass over the turned back portions 52 and 53 and slide down into the end of the channels 54 and 55. The hook is thus freely swinging about the material of the arms 2 and 3 at the point where the arms are turned back.

Figure 13:
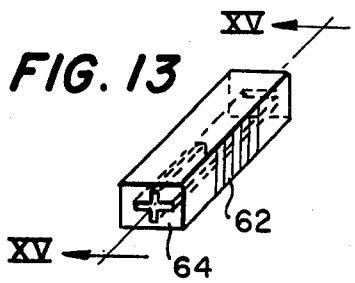
FIGS. 13 and 14 are enlarged perspective views of the hook securing means of this invention.
Figure 14:
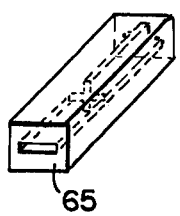

Hook securing means indicated by arrows 60 and 61 and more particularly described in FIGS. 13 and 14 are provided for each arm, said hook securing means being identical for each arm. The external shape of the hook securing means is unimportant but for convenience can be of oblong shape with substantially square cross-section with finger grips being provided on the side, for example shown on side 62 and 63, to assist in moving the hook securing means by finger pressure.

Figure 15:
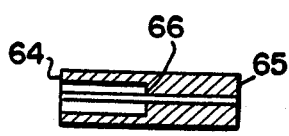
FIG. 15 is an enlarged longitudinal crosssectional view of the hook securing means of FIG. 13.

The hook securing means have specially shaped holes as more particularly shown in reference to FIGS. 13, 14 and 15. The hole has a horizontal component which travels full length of the hook securing means and a vertical component which travels only part way along the length of the hook securing means. Together the horizontal and vertical components of the hole form a hole of a cross-shape in cross-section which begins from the end surface 64, with, as shown in FIG. 15, the vertical component stopping substantially half way along the hook securing means thus defining a shoulder 66 vertically disposed internally in the hook securing means.

The hook securing means is formed independently of the arm and can be threaded over the end of the arm (before the normally shaped hook is itself engaged in the channel 55) by urging the turned back portion 53 in towards the main portion of the arm 3 such that the horizontal component of the hole in the hook securing means passes over the shoulder 57 and is then slideably engaged on the arm in the position, e.g. 67 on arm 2. The eyelet of the desired hook can then be passed over the turned back portion 52 to engage in the channel 54 whereupon the hook securing means can be urged downwards by finger pressure, the turned back portion 52 being urged inwards towards the main portion of the arm 2 so that both the main portion of the arm 2 and the turned back portion 52 are received in the horizontal component of the hole. The eyelet portion 58 of the hook being in a plane perpendicular to the plane of the arm is received in the vertical component of the hole in the leading portion of the hook securing means 60. The position of the shoulder 66 and the shoulder 56 on the turned back portion 52 are such that the eyelet abuts against the shoulder 66 at the same time as the end 65 of the hook securing means 60 passes over the shoulder 56. The natural resilience in the turned back portion 52 causes this portion to spring back into position away from the main portion of the arm 2 on release of the finger pressure thereon. The hook securing means is then secured in the position shown as 68 on arm 3. Firstly, the part of the turned back portion 53 which is held in the horizontal component of the hole in the hook securing means, desirably in a neat fit, prevents twisting motion of the hook securing means while shoulders 66 and 57 prevent longitudinal motion of the hook securing means.

There will be some slack in the movement of the hook by the eyelet 55 pivoting about the turned back portion in the vertical component of the slot and also a limited amount of movement in the horizontal component of the slot although this is less pronounced in view of the eyelet being retained within the vertical component of the slot and also by the limited dimensions in the channel 55.

The slack will be more pronounced for a smaller size hook but it has been found to be of limited importance in the ultimate achievement of catching a fish since the whole fish hook itself is not rigid and any sudden movement caused by the slack being stopped at the ends of the respective vertical or horizontal components of the hole is taken up by the resilience in the arm 2 or 3.

Standard hooks can be replaced in a simple manner by finger pressure on the turned back portion 53 forcing this portion towards the main portion allowing the hook securing means to slide back over the shoulder into position 67.

The turned back portion is preferably designed such that the extreme inside portion of the shoulder 56, namely point X and the end point on the extremity of the arm 52, namely point Y, both touch the surface of the main portion of the arm 2 at the same time. In this manner releasing of the hook securing means 63 over the shoulder 57 is facilitated.

The material in the arms 2 and 3 will need to be resilient in the manner previously discussed in relation to the arms in FIG. 1 and a preferred material having both satisfactory resilience and also a resistance to bending is 16 gauge 064 type 302 stainless spring steel.

Figure 12:
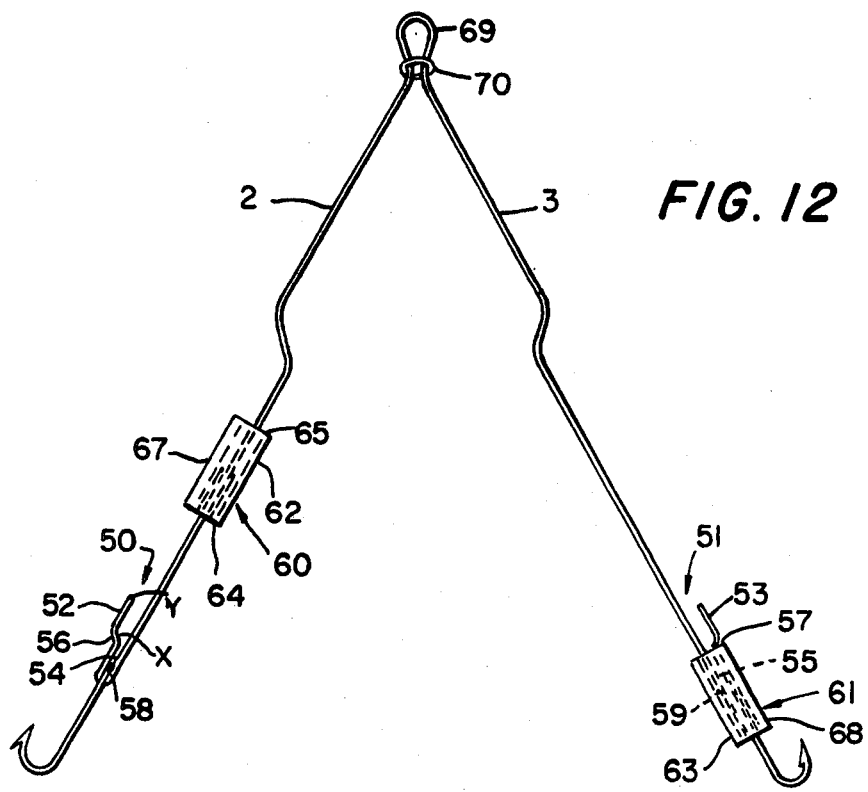
FIG. 12 is a plan view of an alternative fish hook of this invention showing the novel hook securing means.

A further feature of this invention is illustrated in FIG. 12, whereby instead of providing a loop at the apex of the arms 2 and 3 which requires special machinery, the arms 2 and 3 can be bent in a plane in the manner shown with the apex portion 69 formed substantially semi-circular in shape, turning back towards each other before again diverging into the arms 2 and 3 forming a neck portion. A suitably sized ring of either rigid or resilient material can be slid over the arms 2 and 3 from the hook securing end by forcing the arms in towards each other, the ring 70 nestling in the neck portion against the apex portion which prevents the ring from sliding off that end.

The trace for the fishing line can then be simply fed through the ring.

Figure 16:
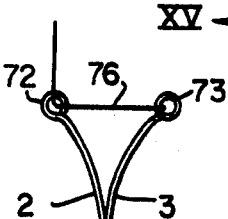
FIG. 16 is a plan view of another embodiment of the fish hook.

In an alternative form of this invention as shown in FIG. 16, a fish hook can be provided with two arms 2 and 3 pivotally mounted together near their central portion at point 71 in such a manner and said arms being of such a shape that closing one pair of ends of the two arms causes the other pair of ends rotating on the pivot to open, each of said arms 2 and 3 bearing at one end laterally extending spikes 74 and 75 and at their other end an eyelet 72 and 73. The arms can be biassed about the pivot to a position such that the spiked ends are together whereby a single piece of bait (not shown) can be secured about both ends to hold said ends together. The other eyelet ends 72 and 73 of the arms are thus spread apart with a trace 76 being secured to one eyelet 73 and passing through the second eyelet 72 and then being joined to a fishing line. So that on a fish tugging at the bait, the force of the tug is transmitted against the trace which urges the two eyelet ends 72 and 73 together which in turn causes the spiked ends 74 and 75 to move apart. The position of the pivot 71 can be chosen to give a desired mechanical advantage of the movement of the eyelet ends 72 and 73 in transmission to the spiked ends 74 and 75. A fish on tugging at the bait will thus cause the trace to tighten hence causing the two spiked ends to move apart to secure in the fish's mouth. Since the spiked ends are held together by the bait, the bait will be chosen so that there is limited resistance to the movement of the spiked ends apart.

Figure 17:
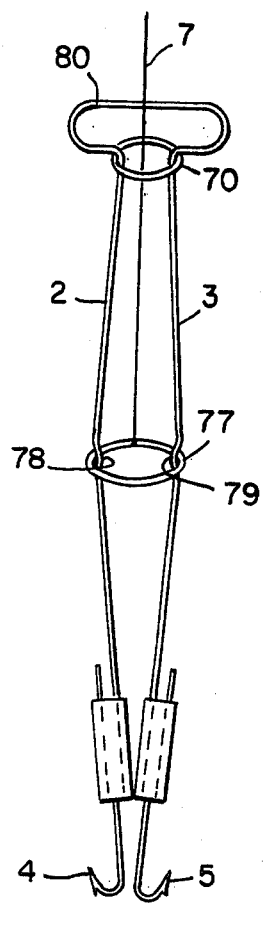
FIG. 17 is a plan view of a further alternative arrangement of the fish hook of this invention in an actuated position.
Figure 18:
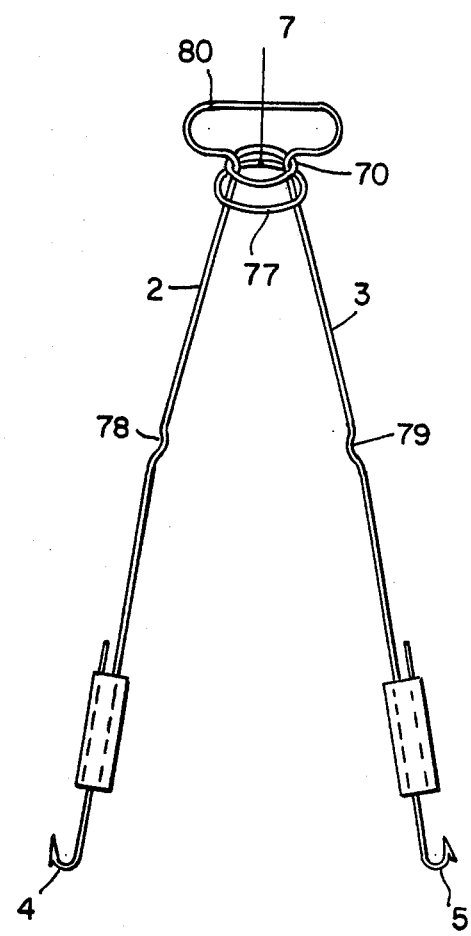
FIG. 18 is a plan view of the FIG. 17 embodiment after it has been actuated.

A further alternative arrangement of the fish hook of this invention is shown in reference to FIGS. 17 and 18 in which the actuating means is a ring 77 of preferably rigid material which is locatable against shoulders 78 and 79 on the arms 2 and 3 respectively.

The shoulders 78 and 79 can be formed by bending the arms 2 and 3 inwardly to form such a shoulder or alternatively the shoulder can be formed by providing a notch in each of the arms into which the ring 77 fits in a snug manner. The notch formation is preferred since it does inhibit the ring being forced too far down the arms since the other inclined face of the notch opposite the shoulders 78 and 79 will limit travel of the ring in the direction towards the spiked ends 4 and 5.

The shoulder on each arm, e.g. 78 will be a smooth curve sufficiently sharp to hold the ring in place against the tension generated in the arms 2 and 3 by forcing the arms together but also of smal enough dimension to allow the ring to slide smoothly thereover. A shoulder formed of a height about equal to the thickness of the ring 77 has been found to be suitable.

When a fish strikes at bait located on the spiked ends 4 and 5 is causes a reaction in the opposite direction on the fishing line or trace 7 secured to the ring 77, which on sliding over the shoulders 78 and 79 allows the upper portion of the arms 2 and 3 to slide rapidly through the ring following the direction of the tug by the fish. This rapid movement in turn causes the spiked ends 4 and 5 to spring rapidly apart thus assisting in securing the fish in the manner discussed above.

As discussed in reference to FIGS. 12 to 14 of the drawings the fishing line 7 passes through a further small ring so that said ring 77 on sliding up the arms 2 and 3 strikes against said ring 70 and hence the whole fish hook itself is retained by the fishing line.

However, since the only means of retaining the whole fish hook on the line is the line itself passing through the ring 70 and since there will be a possibility that a fisherman inadvertently would secure his fishing line to the ring 77 without first threading it through the ring 70, the head portion of the fish hook can be increased in size so that the ring 70 cannot pass over said head portion. The head portion is, for example, shaped in the manner shown as 80 in FIG. 17.

The fish hook after it has been actuated is shown in FIG. 18, i.e. where the arms 2 and 3 have sprung apart.

Arms 2 and 3 in their natural state are preferably in the shape of a slight curve over their whole length, said curve being inwards towards each other. In this way the spiked ends 4 and 5 are brought into close disposition by the ring urging the two arms together when secured in the notches.

I claim:

1. A fish-catching device, comprising at least two arms adapted to be biased towards each other and each having a main portion and an end portion which is turned back whereby a channel is defined between the end portion and the main portion, a plurality of fishhooks each having an eyelet at one end and a spike at the other end, the eyelets of the fishhooks being threaded over the end portions of the arms respectively and being received in the channels defined between the end portions and the main portions of the arms respectively, a plurality of elongate hook securing members mounted on the arms respectively and each formed with a hole having a horizontal component passing completely therethrough and a vertical component passing part way therethrough, the horizontal component being adapted to engage in a neat fit with the main portion and the end portion of the arm and the vertical component being adapted to engage with the eyelet of the fishhook, and actuating means adapted to cooperate with the arms such that in a first condition of the actuating means the arms are in a biassed condition and the spikes of the fishhooks are located close together whereas upon a desired force being applied to the spikes the actuating means actuate and the spikes of the fishhooks move apart.

2. A device as claimed in claim 1, wherein the actuating means are connected to a fishing line such that force applied to the spikes causes the actuating means to actuate.

3. A device as claimed in claim 1, wherein the end portion of each arm is formed having a laterally extending shoulder part way therealong and the vertical component of the hole in each hook securing member terminates in an internal shoulder such that the hook securing member is locked into position by one end engaging against the shoulder of the end portion and the internal shoulder engaging against the eyelet of the fishhook.

4. A device as claimed in claim 1, wherein the actuating means comprise a ring slidable on the arms and engageable against a shoulder on each of the arms in its actuating condition to hold the spikes of the fishhooks close to each other.

5. A device as claimed in claim 4, wherein a head portion is formed on the arms of a dimension sufficient to prevent the ring from sliding thereover.

* * * * *